(12) United States Patent
Nakagawa et al.

(10) Patent No.: US 8,254,783 B2
(45) Date of Patent: Aug. 28, 2012

(54) POINT-TO-MULTIPOINT OPTICAL COMMUNICATION SYSTEM

(75) Inventors: Junichi Nakagawa, Tokyo (JP); Masamichi Nogami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 328 days.

(21) Appl. No.: 12/664,678

(22) PCT Filed: Jul. 18, 2007

(86) PCT No.: PCT/JP2007/064206
§ 371 (c)(1),
(2), (4) Date: Dec. 15, 2009

(87) PCT Pub. No.: WO2009/011053
PCT Pub. Date: Jan. 22, 2009

(65) Prior Publication Data
US 2010/0189436 A1    Jul. 29, 2010

(51) Int. Cl.
*H04J 14/02* (2006.01)
(52) U.S. Cl. ............................ 398/72; 398/68
(58) Field of Classification Search ............... 398/66–72
See application file for complete search history.

(56) References Cited

U.S. PATENT DOCUMENTS

2009/0263133 A1   10/2009   Nakagawa et al.

FOREIGN PATENT DOCUMENTS

| JP | 2001 251252 | 9/2001 |
| JP | 2002 141927 | 5/2002 |
| JP | 2002 261697 | 9/2002 |
| JP | 2002 271271 | 9/2002 |
| WO | 2007 066757 | 6/2007 |

OTHER PUBLICATIONS

Office Action issued Jul. 5, 2011, in Japan Patent Application No. 2009-523491.

*Primary Examiner* — Leslie Pascal
(74) *Attorney, Agent, or Firm* — Oblon, Spivak, McClelland, Maier & Neustadt, L.L.P.

(57) ABSTRACT

Provided is a point-to-multipoint optical communication system capable of extending a transmission distance between a subscriber apparatus and a station apparatus without changing wavelengths of an upstream optical signal and a downstream optical signal, which are used in both of the apparatuses. The point-to-multipoint optical communication system includes, as a basic configuration thereof, an optical network for connecting one station apparatus (1) to a plurality of (n) subscriber apparatuses (4). Among m basic configurations, one station-side wavelength multiplexer/demultiplexer (22), one optical fiber transmission line (30), and one subscriber-side wavelength multiplexer/demultiplexer (12) are shared. The point-to-multipoint optical communication system further includes a station-side repeating unit (20) and a subscriber-side repeating unit (10) each including the one wavelength multiplexer/demultiplexer (22 or 12) and m wavelength converters (21 or 11). An optical signal having a conventionally-used wavelength is used between the station apparatus (1) and the station-side repeating unit (20) and between the subscriber apparatus (4) and the subscriber-side repeating unit (10), and an extensible optical signal, on which wavelength division multiplexing has been performed, is used between the wavelength multiplexers/demultiplexers (12 and 22) via the optical fiber transmission line (30).

2 Claims, 4 Drawing Sheets

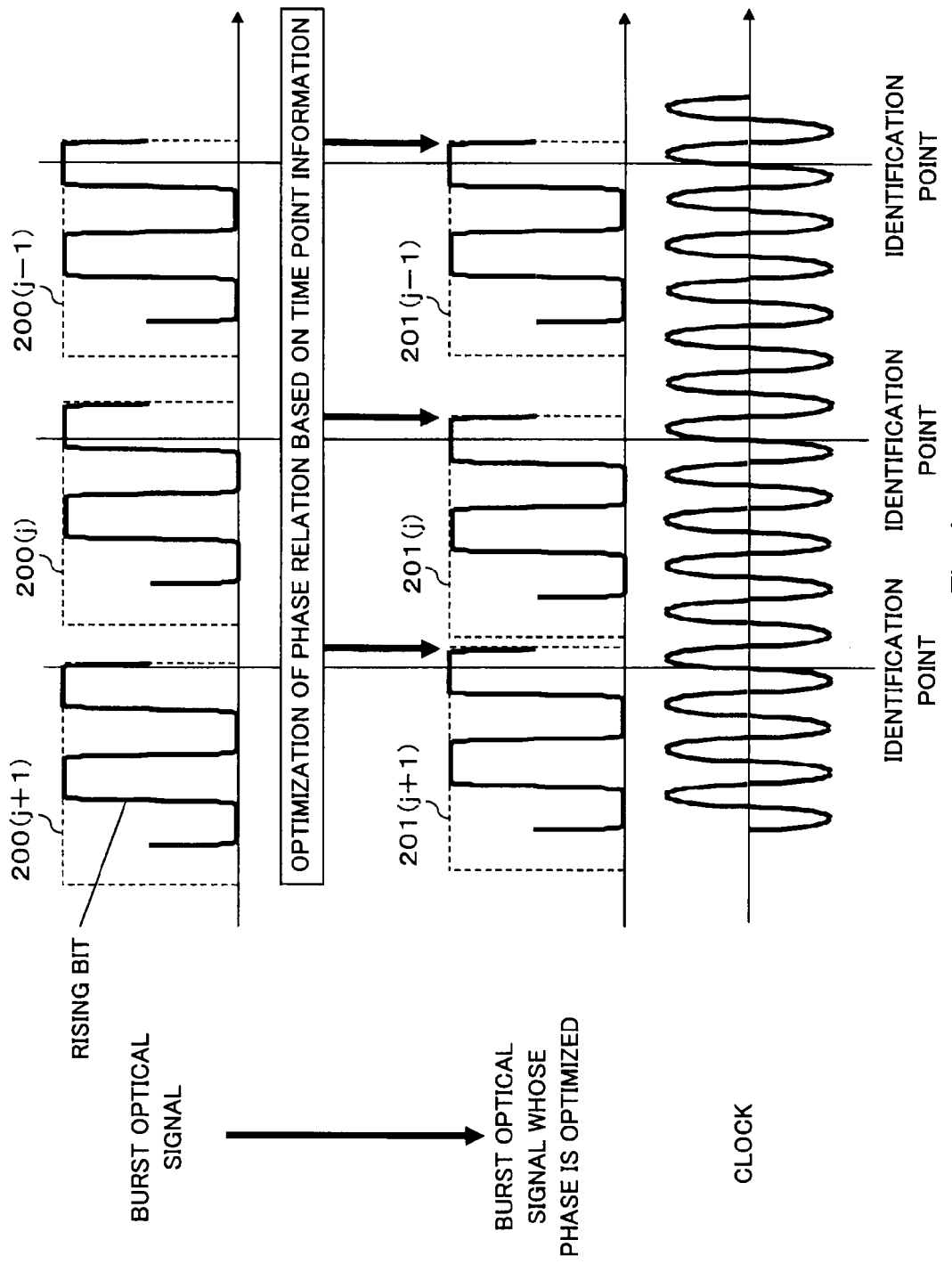

POINT-TO-MULTIPOINT OPTICAL COMMUNICATION SYSTEM

TECHNICAL FIELD

The present invention relates to a point-to-multipoint optical communication system in which a station apparatus and a plurality of subscriber apparatuses transmit and receive data to and from each other via one optical network, and more particularly, to a point-to-multipoint optical communication system that realizes extension of a transmission distance and a larger capacity.

BACKGROUND ART

As one embodiment of the point-to-multipoint optical communication system, there has been discussed extension of a transmission distance by providing a regenerative repeater and a wavelength converter between a station apparatus and a subscriber apparatus. There has been further discussed improvement in efficiency of sharing an optical fiber transmission line by performing multiplexing in a plurality of point-to-multipoint optical communication systems through a wavelength division multiplexing technology (see, for example, Patent Document 1).

In the conventional configuration, on a subscriber apparatus side, one wavelength converter and a multiplexer (MUX)/demultiplexer (DEMUX) for multiplexing and demultiplexing wavelengths are provided between the station apparatus and the plurality of subscriber apparatuses. Further, on the station apparatus side, a MUX/DEMUX for multiplexing and demultiplexing wavelengths is provided.

In such a system configuration as described above, upstream optical signals each having a wavelength of 1.3 μm, which have been transmitted from the plurality of subscriber apparatuses, are regenerated and repeated by the wavelength converter provided between the station apparatus and the plurality of subscriber apparatuses.

More specifically, upstream optical signals are regenerated and repeated through the following series of processing. First, upstream optical signals are opto-electrically converted into electric signals by a light receiving element. Subsequently, the electric signals obtained through the opto-electric conversion are electrically regenerated by a reception circuit having a 2R function or a 3R function. Further, the signals thus electrically regenerated are electro-optically converted into optical signals again by a driver circuit and a light emitting element.

In addition, at the same time when the regenerative repeating is performed, the wavelength of 1.3 μm is converted into a wavelength $\lambda i$. Then, wavelength division multiplexing is performed by the MUX/DEMUX on the subscriber side, to thereby realize wavelength division multiplexing transmission employing the wavelength division multiplexing (WDM) technology in an extension section.

Further, on the station apparatus side, wavelength division demultiplexing is performed by the MUX/DEMUX provided on the station apparatus side, and therefore the signals each having the wavelength $\lambda i$ are extracted, which are received by an i-th station apparatus.

Conversely, for downstream optical signals each having the wavelength $\lambda i$, which have been transmitted from the i-th station apparatus, wavelength division multiplexing is performed by the MUX/DEMUX provided on the station apparatus side, to thereby realize the wavelength division multiplexing transmission employing the wavelength division multiplexing technology in the extension section.

Further, similarly to the case of the upstream optical signals, the MUX/DEMUX on the subscriber side, which is provided between the station apparatus and the plurality of subscriber apparatuses, demultiplexes the optical signals, on which the wavelength division multiplexing has been performed, to extract the signals each having the i-th wavelength $\lambda i$. In addition, the wavelength converter performs opto-electric conversion, regenerative repeating, and electro-optic conversion on the extracted optical signals each having the wavelength $\lambda i$, and at the same time, converts the wavelength $\lambda i$ into the wavelength of 1.3 μm. Finally, the plurality of subscriber apparatuses receive the signals having the wavelength of 1.3 μm obtained through the wavelength conversion, respectively.

Further, in the configuration of the conventional wavelength converter, for both the upstream signals and the downstream optical signals, the wavelength of 1.3 μm is used in an access section, while the wavelength $\lambda i$ is used in the extension section. Therefore, a 3-dB coupler is adopted for multiplexing and demultiplexing the upstream signals and the downstream signals.

Further, the upstream signals and the downstream signals are regenerated and repeated in a separate manner in the wavelength converter. Hence, the upstream signals and the downstream signals do not affect each other basically.

As described above, adopting the wavelength converter and the MUX/DEMUX, which are described in Patent Document 1, enables extension of the transmission distance in the extension section corresponding to the section between the station apparatus and the wavelength converter, in addition to the conventional access section corresponding to the section between the station apparatus and the subscriber apparatus.

Patent Document 1: JP 2002-261697 A

DISCLOSURE OF THE INVENTION

Problems to be Solved by the Invention

However, the conventional technology has the following problems.

In the gigabit Ethernet (registered trademark) passive optical network (GE-PON) system which is widely used as the optical subscriber system currently, a wavelength of 1.3 μm is used for upstream optical signals and a wavelength of 1.49 μm is used for downstream optical signals. Hence, the conventional configuration, in which the 3-dB coupler is adopted for multiplexing and demultiplexing the upstream signals and the downstream signals, cannot directly be applied to the GE-PON system.

Further, in the conventional configuration, the signals each having the wavelength $\lambda i$ used in the extension section are directly input and output to and from the station apparatus. Hence, the wavelength $\lambda i$ used in the extension section is different from the wavelength of 1.3 μm used in the case where the extension technology is not adopted. Therefore, in the case where the extension technology such as the wavelength converter is adopted, the station apparatus that has already been installed needs to be replaced with an apparatus that may handle the wavelength $\lambda i$.

Moreover, with regard to the detailed configuration of the conventional wavelength converter, no time point information of reference burst emission is used at the time of 2R or 3R regeneration of the upstream optical signals transmitted through burst transmission. Hence, jitter, pulse width distortion, and the like are accumulated in the access section, which may raise a problem that the performance such as transmission efficiency in the entire system may decline compared with the case where the wavelength converter is not adopted.

The present invention has been made to solve the problems as described above, and it is therefore an object of the present invention to provide a point-to-multipoint optical communication system capable of extending a transmission distance between a subscriber apparatus and a station apparatus without changing wavelengths of an upstream optical signal and a downstream optical signal, which are used in both of the apparatuses.

Means for Solving the Problems

A point-to-multipoint optical communication system according to the present invention includes, as a basic configuration thereof, an optical communication system in which one station apparatus is connected to a plurality of (n: n representing an integer of 2 or larger) subscriber apparatuses via one station-side wavelength multiplexer/demultiplexer, one optical fiber transmission line, and one subscriber-side wavelength multiplexer/demultiplexer, which form an optical network, and each of the one station apparatus and the plurality of (n) subscriber apparatuses outputs an optical signal to the optical network through time division multiplexing or wavelength division multiplexing. The point-to-multipoint optical communication system has m (m representing an integer of 2 or larger) basic configurations applied thereto, in which m station apparatuses are connected to a plurality of ($n_1$ to $n_m$: $n_1$ to $n_m$ each representing an integer of 2 or larger) subscriber apparatuses, respectively, and among which the one station-side wavelength multiplexer/demultiplexer, the one optical fiber transmission line, and the one subscriber-side wavelength multiplexer/demultiplexer are shared. The point-to-multipoint optical communication system further includes: m subscriber-side wavelength converters that are provided, in the m basic configurations, between the plurality of ($n_1$ to $n_m$) subscriber apparatuses and the one subscriber-side wavelength multiplexer/demultiplexer, respectively, and that converts, through wavelength conversion, an upstream optical signal having a first wavelength commonly allocated to the plurality of ($n_1$ to $n_m$) subscriber apparatuses into an upstream optical signal having a wavelength allocated in advance for each of the m basic configurations, and converts, through the wavelength conversion, a downstream optical signal having the wavelength allocated in advance for the each of the m basic configurations, which is extracted by the one subscriber-side wavelength multiplexer/demultiplexer, into a downstream optical signal having a second wavelength commonly allocated to the plurality of ($n_1$ to $n_m$) subscriber apparatuses; and m station-side wavelength converters that are provided, in the m basic configurations, between the m station apparatuses and the one station-side wavelength multiplexer/demultiplexer, respectively, and that converts, through the wavelength conversion, the upstream optical signal having the wavelength allocated in advance for the each of the m basic configurations, which is extracted by the one station-side wavelength multiplexer/demultiplexer, into the upstream optical signal having the first wavelength, and converts, through the wavelength conversion, the downstream optical signal having the second wavelength into the downstream optical signal having the wavelength allocated in advance for the each of the m basic configurations.

Effect of the Invention

According to the present invention, a repeating unit including one wavelength multiplexer/demultiplexer and a plurality of wavelength converters is provided on both the station apparatus side and the subscriber apparatus side, and optical signals, on which the wavelength division multiplexing has been performed, are transmitted and received via the optical fiber transmission line provided in the extension section. Accordingly, it becomes possible to provide the point-to-multipoint optical communication system capable of extending the transmission distance between the subscriber apparatus and the station apparatus without changing the wavelengths of the upstream optical signal and the downstream optical signal, which are used in both of the apparatuses.

BRIEF DESCRIPTION OF THE DRAWINGS

FIG. 4 A diagram illustrating a state of the burst optical signals in a case where the electric signal regeneration is performed by extracting the time point information of the burst emission timing of the downstream optical signals according to the second embodiment of the present invention.

BEST MODES FOR CARRYING OUT THE INVENTION

Hereinafter, with reference to the drawings, description is given of preferred embodiments of a point-to-multipoint optical communication system according to the present invention.

First Embodiment

Figure 1:
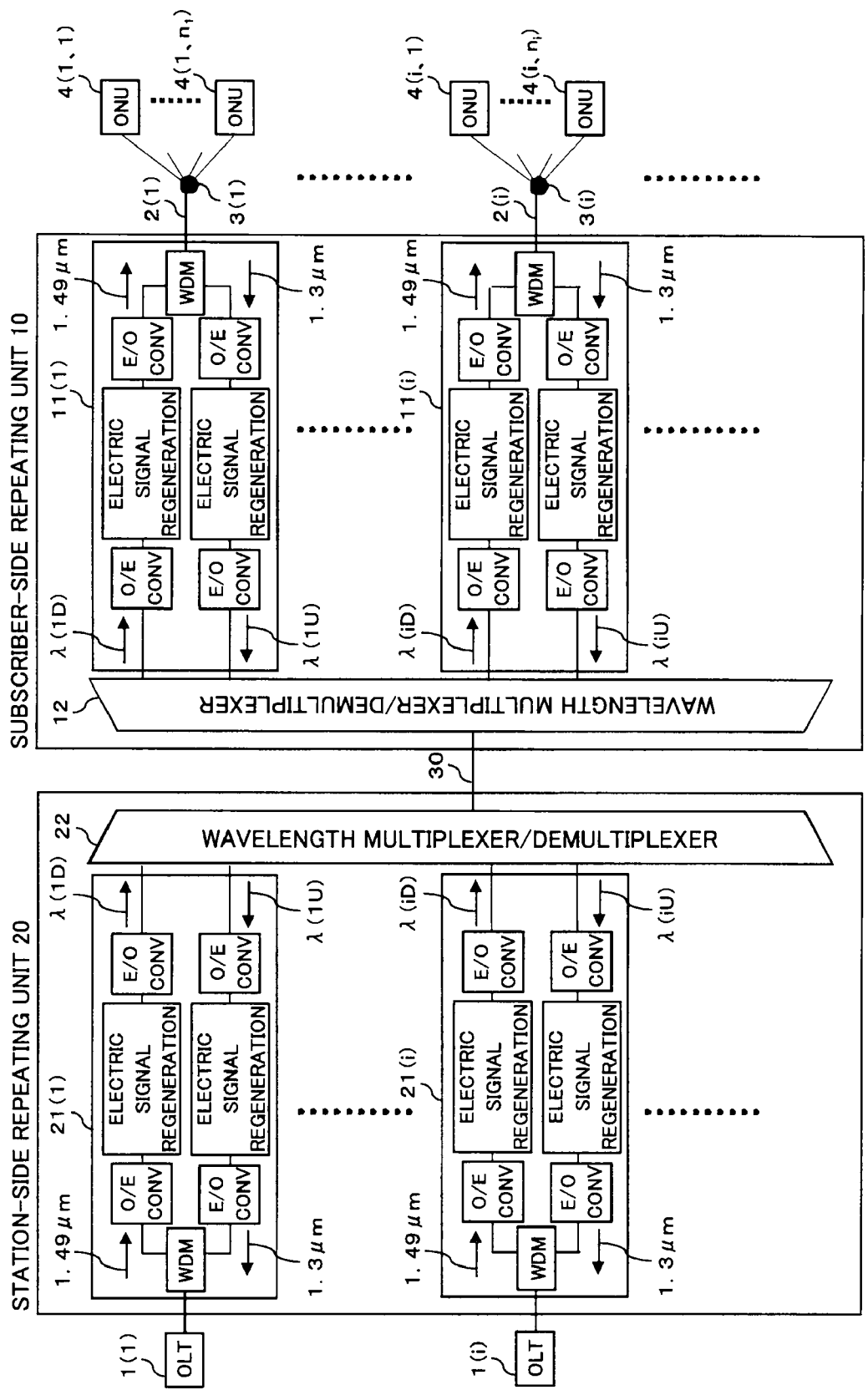
FIG. 1 A configuration diagram of a point-to-multipoint optical communication system according to a first embodiment of the present invention.

FIG. 1 is a configuration diagram of a point-to-multipoint optical communication system according to a first embodiment of the present invention. The point-to-multipoint optical communication system of FIG. 1 includes: m (m represents an integer of 2 or larger) station apparatuses 1(1) to 1(m); m optical fibers 2(1) to 2(m); m star couplers 3(1) to 3(m); $n_i$ ($n_i$ represents an integer of 2 or larger) subscriber apparatuses 4(i,1) to 4(i,$n_i$) connected to an i-th (i represents an integer of 1 or larger and m or smaller) star coupler 3(i); a subscriber-side repeating unit 10; a station-side repeating unit 20; and an optical fiber transmission line 30.

Further, the subscriber-side repeating unit 10 corresponding to an intermediate station side includes m wavelength converters 11(1) to 11(m) and one wavelength multiplexer/demultiplexer 12. Similarly, the station-side repeating unit 20 includes m wavelength converters 21(1) to 21(m) and one wavelength multiplexer/demultiplexer 22.

In this case, the m wavelength converters 11(1) to 11(m) provided within the subscriber-side repeating unit 10 each correspond to a subscriber-side wavelength converter, and the one wavelength multiplexer/demultiplexer 12 corresponds to a subscriber-side wavelength multiplexer/demultiplexer. Further, the m wavelength converters 21(1) to 21(m) provided within the station-side repeating unit 20 each correspond to a station-side wavelength converter, and the one wavelength multiplexer/demultiplexer 22 corresponds to a station-side wavelength multiplexer/demultiplexer.

As described above, the point-to-multipoint optical communication system illustrated in FIG. 1 includes m sets of basic-configuration optical communication systems each including: the one i-th station apparatus 1(i); and the plurality of ($n_i$) subscriber apparatuses 4(i,1) to 4(i,$n_i$) connected to the star coupler 3(i) corresponding to the i-th station apparatus 1(i).

Further, in the configuration of FIG. 1, the subscriber-side repeating unit 10 and the station-side repeating unit 20 are connected to each other via the one wavelength multiplexer/demultiplexer 12, the one wavelength multiplexer/demultiplexer 22, and the common optical fiber transmission line 30 provided between the wavelength multiplexer/demultiplexer 12 and the wavelength multiplexer/demultiplexer 22.

In other words, connection is made via the optical fiber 2(i) in an access section corresponding to the section between the wavelength converter 11(i) and the star coupler 3(i) to which the plurality of ($n_i$) subscriber apparatuses 4(i,1) to 4(i,$n_i$) are connected. On the other hand, connection is made via the common optical fiber transmission line 30 in an extension section corresponding to the section between the wavelength multiplexer/demultiplexer 12 and the wavelength multiplexer/demultiplexer 22.

Further, in the optical fiber transmission line 30 provided in this extension section, the wavelength division multiplexing technology is adopted to perform multiplexing between the wavelength multiplexer/demultiplexer 12 and the wavelength multiplexer/demultiplexer 22 via one fiber.

Next, description is given of operation of the point-to-multipoint optical communication system having the configuration of FIG. 1. An upstream optical signal is described first. An upstream optical signal having a wavelength of 1.3 µm is transmitted from any one of the subscriber apparatuses 4(i,1) to 4(i,$n_i$) connected to the star coupler 3(i). In this case, the wavelength of 1.3 µm corresponds to a first wavelength commonly allocated to all the station apparatuses 1 and all the subscriber apparatuses 4 as a wavelength of the upstream signal.

The wavelength converter 11(i) on the intermediate station side performs opto-electric conversion, electric signal regeneration, electro-optic conversion, and wavelength conversion on the upstream optical signal having the wavelength of 1.3 µm. At the time of the wavelength conversion, in order to apply the wavelength division multiplexing transmission by adopting the wavelength division multiplexing technology in the extension section, the wavelength converter 11(i) converts the wavelength of 1.3 µm to a wavelength λ (iU), where "U" represents "UP" that indicates the upstream direction.

The wavelength multiplexer/demultiplexer 12 performs wavelength division multiplexing on the optical signals having the wavelength λ(1U) to the wavelength λ (mU) which have been obtained through the wavelength conversion by the m wavelength converters 11(1) to 11(m), and transmits the light, on which the wavelength division multiplexing has been performed, to the optical fiber transmission line 30 provided in the extension section. Note that the wavelength intervals ranging from the wavelength λ (1U) to the wavelength λ (mU) for performing the wavelength division multiplexing may be a wavelength grid of coarse WDM (CWDM) or may be a wavelength grid of dense WDM (DWDM).

The wavelength multiplexer/demultiplexer 22 within the station-side repeating unit 20 demultiplexes the optical signals each having the wavelength λ (iU) from the light, on which the wavelength division multiplexing has been performed, and transmits the optical signals to the i-th wavelength converter 21(i). Then, the i-th wavelength converter 21(i) performs opto-electric conversion, electric signal regeneration, electro-optic conversion, and wavelength conversion on the optical signals each having the wavelength λ(iU). As a result, the optical signals each having the wavelength λ(iU) are converted into the optical signals each having the wavelength of 1.3 µm again.

Through the above-mentioned series of signal processing performed on the upstream optical signals, it becomes possible to use the wavelength λ(iU) suitable for wavelength division multiplexing only in the extension section. Further, it becomes possible to use the wavelength of 1.3 µm for the optical signal output from the subscriber apparatus 4 and the optical signal input to the station apparatus 1. As a result, extension of the transmission distance can be realized only by adding the subscriber-side repeating unit 10, the station-side repeating unit 20, and the optical fiber transmission line 30, without changing the existing station apparatus 1 and subscriber apparatus 4 that have already been installed.

The same applies to the downstream optical signal. Downstream optical signals each having a wavelength of 1.49 µm are transmitted from the i-th station apparatus 1(i). In this case, the wavelength of 1.49 µm corresponds to a second wavelength commonly allocated to all the station apparatuses 1 and all the subscriber apparatuses 4 as a wavelength of the downstream signal.

The wavelength converter 21(i) within the station-side repeating unit 20 performs opto-electric conversion, electric signal regeneration, electro-optic conversion, and wavelength conversion on the downstream optical signals each having the wavelength of 1.49 µm. At the time of the wavelength conversion, in order to apply the wavelength division multiplexing transmission by adopting the wavelength division multiplexing technology in the extension section, the wavelength converter 21(i) converts the wavelength of 1.49 µm to a wavelength λ(iD), where "D" represents "DOWN" that indicates the downstream direction.

The wavelength multiplexer/demultiplexer 22 performs wavelength division multiplexing on the optical signals having the wavelength λ(1D) to the wavelength λ(mD) which have been obtained through the wavelength conversion by the m wavelength converters 21(1) to 21(m), and transmits the light, on which the wavelength division multiplexing has been performed, to the optical fiber transmission line 30 provided in the extension section. Note that the wavelength intervals used in a range from the wavelength λ(1D) to the wavelength λ(mD) for performing the wavelength division multiplexing may be a wavelength grid of coarse WDM (CWDM) or may be a wavelength grid of dense WDM (DWDM).

The wavelength multiplexer/demultiplexer 12 within the subscriber-side repeating unit 10 demultiplexes the optical signals each having λ(iD) from the signals, on which the wavelength division multiplexing has been performed, and transmits the optical signals to the i-th wavelength converter 11(i). Then, the i-th wavelength converter 11(i) performs opto-electric conversion, electric signal regeneration, electro-optic conversion, and wavelength conversion on the optical signals each having the wavelength λ(iD). As a result, the optical signals each having the wavelength λ(iD) are converted into the optical signals each having the wavelength of 1.49 µm again.

Similarly to the case of the upstream optical signals, through the above-mentioned series of signal processing performed on the downstream optical signals, it becomes possible to use the wavelength λ(iD) suitable for wavelength division multiplexing only in the extension section. Further, it becomes possible to use the wavelength of 1.49 μm for the optical signal output from the station apparatus 1 and the optical signal input to the subscriber apparatus 4. As a result, extension of the transmission distance can be realized only by adding the subscriber-side repeating unit 10, the station-side repeating unit 20, and the optical fiber transmission line 30, without changing the existing station apparatus 1 and subscriber apparatus 4 that have already been installed.

As described above, according to the first embodiment, the repeating units each including the one wavelength multiplexer/demultiplexer and the plurality of wavelength converters are provided on both of the station apparatus side and the subscriber apparatus side. As a result, it becomes possible to implement the point-to-multipoint optical communication system capable of extending the transmission distance without replacing the existing GE-PON system apparatus.

Second Embodiment

In a second embodiment, description is given of a method of synchronizing upstream optical signals with downstream optical signals by using time point information extracted at the time of electric signal regeneration of the downstream optical signals, when electric signal regeneration of the upstream optical signals is performed in the wavelength converter.

Figure 2:
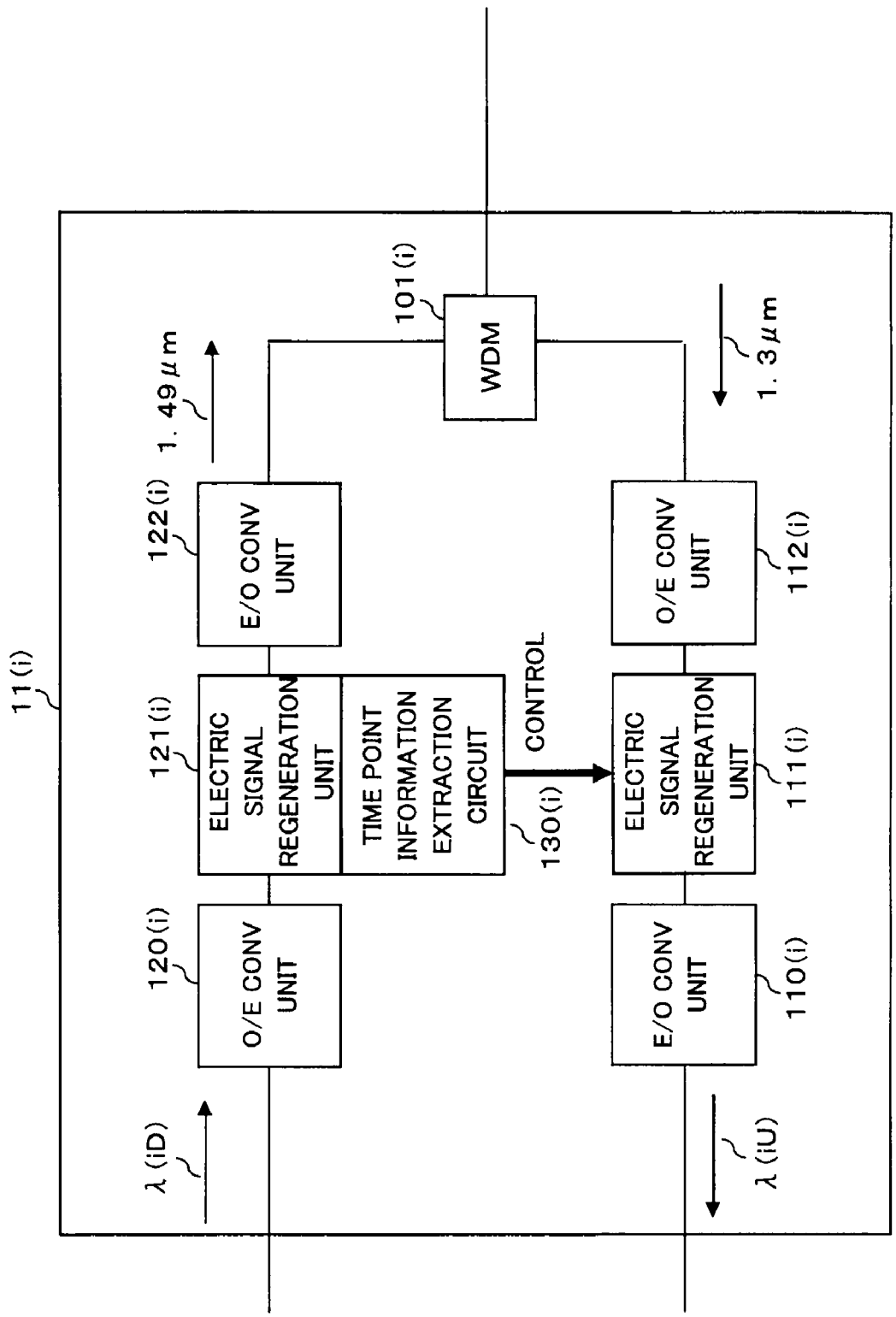
FIG. 2 A detailed configuration diagram of a wavelength converter within a subscriber-side repeating unit, which is applied to a point-to-multipoint optical communication system according to a second embodiment of the present invention.

FIG. 2 is a detailed configuration diagram of the wavelength converter 11(i) within the subscriber-side repeating unit 10, which is applied to the point-to-multipoint optical communication system according to the second embodiment of the present invention.

The wavelength converter 11(i) of FIG. 2 includes: a WDM filter 101(i) for multiplexing and demultiplexing upstream optical signals (each having a wavelength of 1.3 μm) and downstream optical signals (each having a wavelength of 1.49 μm); an opto-electric conversion unit 110(i), an electric signal regeneration unit 111(i), and an electro-optic conversion unit 112(i) which are provided for the upstream optical signals; and an opto-electric conversion unit 120(i), an electric signal regeneration unit 121(i), and an electro-optic conversion unit 122(i) which are provided for the downstream optical signals.

In addition, the wavelength converter 11(i) according to the second embodiment includes a time point information extraction circuit 130(i) for extracting time point information for controlling an emission timing of upstream burst signals based on a result of processing the downstream optical signals by the electric signal regeneration unit 121(i).

Specifically, the time point information extraction circuit 130 corresponds to a phase extraction circuit for detecting, when the wavelength of the downstream optical signal is converted, phase information for each subscriber apparatus, which is contained in the downstream optical signal, and optimizing, when the wavelength of the upstream optical signal is converted, a phase of the upstream optical signal for each subscriber apparatus, which is contained in the upstream optical signal, based on the detected phase information.

The output of the time point information extraction circuit 130(i) is input to the electric signal regeneration unit 111(i) for the upstream burst signals. Then, the electric signal regeneration unit 111(i) performs synchronization processing based on the time point information extracted by the time point information extraction circuit 130(i), and regenerates the upstream burst signals.

Thus, the time point information is extracted from the downstream optical signals and the upstream burst signals are regenerated for the following reason. That is, the respective upstream burst optical signals are burst optical signals transmitted at different time points from different subscriber apparatuses, and hence have different phases even when the respective burst optical signals are arrayed in time series.

Then, with reference to the drawings, description is given of a difference between the electric signal regeneration performed without using the time point information of the burst emission timing of the downstream optical signals and the electric signal regeneration performed using the time point information. First, FIG. 3 is a diagram illustrating a state of burst optical signals in a case where the electric signal regeneration is performed without using the time point information of the burst emission timing of downstream optical signals according to the second embodiment of the present invention.

Figure 3:
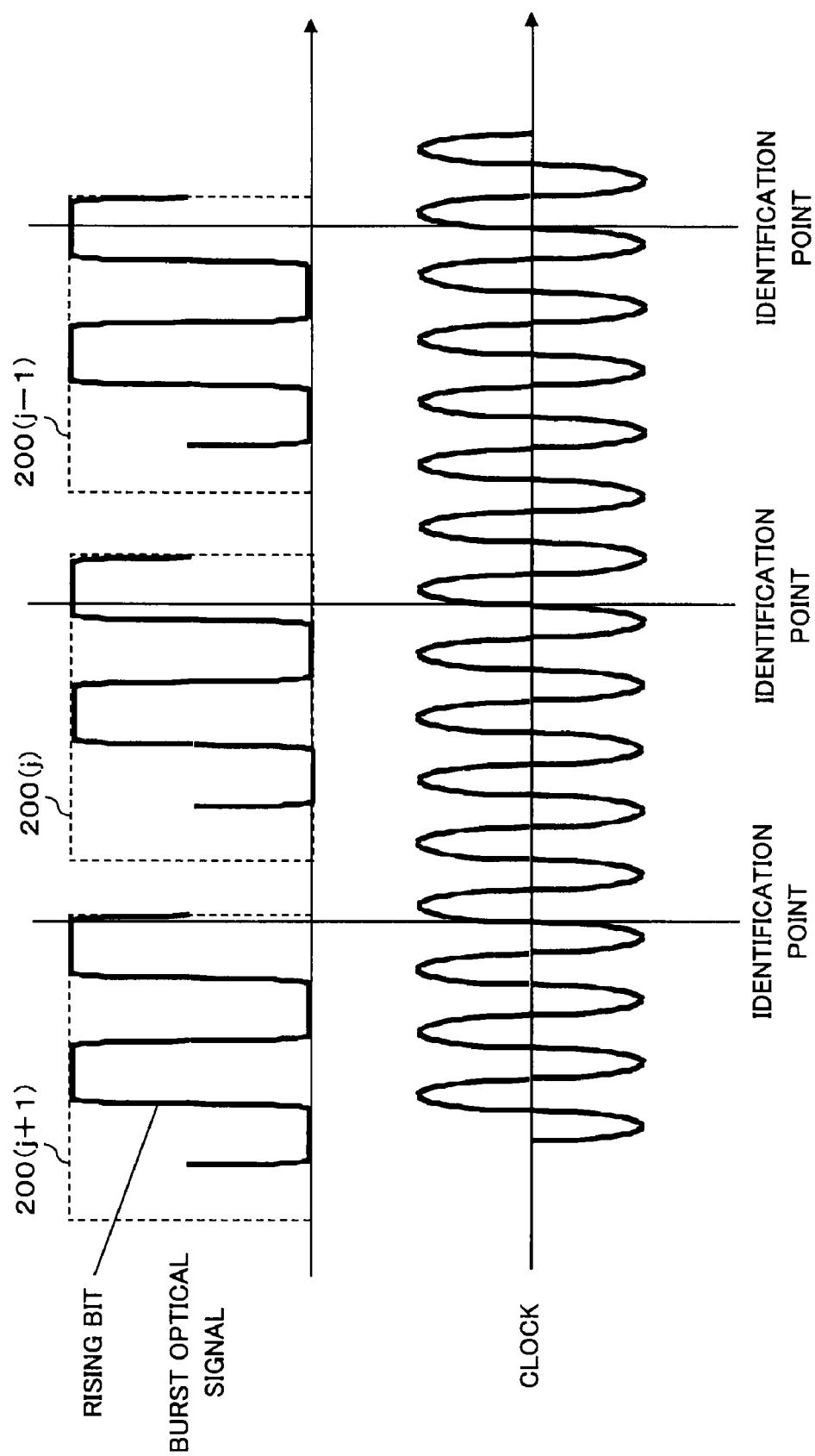
FIG. 3 A diagram illustrating a state of burst optical signals in a case where electric signal regeneration is performed without using time point information of a burst emission timing of downstream optical signals according to the second embodiment of the present invention.

FIG. 3 illustrates three burst signals 200(j−1), 200(j), and 200(j+1) (note that j represents an integer of 2 or larger), which are emitted from three different subscriber apparatuses, respectively. In this case, the three burst signals 200(j−1), 200(j), and 200(j+1) are, for example, upstream optical signals transmitted from three subscriber apparatuses 4(i,j−1), 4(i,j), and 4(i,j+1), respectively, which are connected to the i-th star coupler 3(i). Further, FIG. 3 schematically illustrates rising bits of the burst signals in order to show a phase relation between the burst signal and a clock.

In this case, the three burst signals 200(j−1), 200(j), and 200(j+1) are basically emitted from the different subscriber apparatuses 4(i,j−1), 4(i,j), and 4(i,j+1) at different time points, respectively. Therefore, their phase information indicates no correlation as illustrated in FIG. 3.

Accordingly, for example, in a case where the signals are regenerated by a continuous clock, even when the phase is optimal for the burst signal 200(j−1), the phase is not optimal for the other burst signals 200(j) and 200(j+1), resulting in a risk of occurrence of a bit error.

FIG. 3 exemplifies the case where the burst signal 200(j−1) is within the optimal phase but the burst signals 200(j) and 200(j+1) are out of the optimal phase. Hence, there is a risk of occurrence of a bit error for electric signal regeneration with respect to the burst signals 200(j) and 200(j+1).

On the other hand, FIG. 4 is a diagram illustrating a state of the burst optical signals in a case where the electric signal regeneration is performed by extracting the time point information of the burst emission timing of the downstream optical signals according to the second embodiment of the present invention.

Similarly to FIG. 3 above, FIG. 4 illustrates the three burst signals 200(j−1), 200(j), and 200(j+1), which are emitted from three different subscriber apparatuses, respectively. In this case, the three burst signals 200(j−1), 200(j), and 200(j+1) are, for example, upstream optical signals transmitted from the three subscriber apparatuses 4(i,j−1), 4(i,j), and 4(i,j+1), respectively, which are connected to the i-th star coupler 3(i).

As described with reference to FIG. 3 above, the burst signals 200(j−1), 200(j), and 200(j+1) basically have no correlation, and have phases different from one another. Therefore, synchronization processing is performed by the time point information extraction circuit 130(i) using the time point information of the burst emission timing, which is extracted from the downstream optical signals.

More specifically, the electric signal regeneration unit 111(i) for the upstream burst signals uses the time point information extracted by the time point information extraction circuit 130(i) to initialize a regeneration circuit at the head of each of the burst signals. As a result, the phase between the clock and each of the burst signals 200(j−1), 200(j), and 200(j+1) can be made optimal for each of the burst signals.

The three burst signals 200(j−1), 200(j), and 200(j+1) illustrated in the middle stage of FIG. 4 have their phases optimized. Such optimization of the phase state can be performed by adopting, for example, a CDR circuit which has already been mass-produced and applied to the GE-PON.

As described above, according to the second embodiment, the synchronization using the time point information enables the electric signal regeneration in an optimal phase even in the case of the regeneration of the burst signals. As a result, it becomes possible to suppress jitter and pulse width distortion specific to the burst optical signals from being accumulated, thereby preventing reduction in transmission efficiency in the entire system.

Note that in order to adjust the burst optical signals in the access section so as to have a data format suitable for the WDM optical signals in the extension section, the electric signal regeneration unit for the upstream optical signals desirably has a function of converting the upstream burst signals into a continuous signal.

The invention claimed is:

1. A point-to-multipoint optical communication system, comprising:
    an optical communication system in which one station apparatus is connected to a plurality of n subscriber apparatuses (with n representing an integer of 2 or larger) via one station-side wavelength multiplexer/demultiplexer, one optical fiber transmission line, and one subscriber-side wavelength multiplexer/demultiplexer, which form an optical network;
    each of the one station apparatus and the plurality of (n) subscriber apparatuses configured to output an optical signal to the optical network through time division multiplexing or wavelength division multiplexing;
    the point-to-multipoint optical communication system having m basic configurations (with m representing an integer of 2 or larger) applied thereto, in which m station apparatuses are connected to a plurality of ($n_l$ to $n_m$:$n_l$ to $n_m$ each representing an integer of 2 or larger) subscriber apparatuses, respectively, and among which the one station-side wavelength multiplexer/demultiplexer, the one optical fiber transmission line, and the one subscriber-side wavelength multiplexer/demultiplexer are shared;
    and further comprising:
    m subscriber-side wavelength converters that are provided, in the m basic configurations, between the plurality of ($n_l$ to $n_m$) subscriber apparatuses and the one subscriber-side wavelength multiplexer/demultiplexer, respectively, and that convert, through wavelength conversion, an upstream optical signal having a first wavelength commonly allocated to the plurality of ($n_l$ to $n_m$) subscriber apparatuses into an upstream optical signal having a wavelength allocated in advance for each of the m basic configurations, and that convert, through the wavelength conversion, a downstream optical signal having the wavelength allocated in advance for the each of the m basic configurations, which is extracted by the one subscriber-side wavelength multiplexer/demultiplexer, into a downstream optical signal having a second wavelength commonly allocated to the plurality of ($n_l$ to $n_m$) subscriber apparatuses; and
    m station-side wavelength converters that are provided, in the m basic configurations, between the m station apparatuses and the one station-side wavelength multiplexer/demultiplexer, respectively, and that convert, through the wavelength conversion, the upstream optical signal having the wavelength allocated in advance for the each of the m basic configurations, which is extracted by the one station-side wavelength multiplexer/demultiplexer, into the upstream optical signal having the first wavelength, and that convert, through the wavelength conversion, the downstream optical signal having the second wavelength into the downstream optical signal having the wavelength allocated in advance for the each of the m basic configurations,
    wherein transmission bursts over the one optical fiber transmission line have no correlation and have phases different from one another.

2. A point-to-multipoint optical communication system according to claim 1, wherein each of the m subscriber-side wavelength converters further comprises:
    a phase extraction circuit that detects, when performing the wavelength conversion on the downstream optical signal, phase information for each of the plurality of ($n_l$ to $n_m$) subscriber apparatuses, which is contained in the downstream optical signal, and that optimizes, when performing the wavelength conversion on the upstream optical signal, a phase of the upstream optical signal from the each of the plurality of ($n_l$ to $n_m$) subscriber apparatuses, which is contained in the upstream optical signal, based on the detected phase information, and
    said optimization using time point information of burst emission timing extracted from at least one of the downstream optical signals.

* * * * *